May 16, 1933.  W. HILGERS  1,908,843
MACHINE FOR GRADING EGGS
Filed April 19, 1932

Inventor
Wilhelm Hilgers
by his Attorney

Patented May 16, 1933

1,908,843

UNITED STATES PATENT OFFICE

WILHELM HILGERS, OF DÜSSELDORF, GERMANY

MACHINE FOR GRADING EGGS

Application filed April 19, 1932, Serial No. 606,094, and in Germany April 22, 1931.

This invention relates to a machine for grading eggs or the like by weight, in which scales (adjusted to the definite weights for the several grades) are disposed side by side in a row. To avoid needless repetition only eggs will be hereinafter referred to, but it will be understood the invention might be used for grading other articles, such as certain fruits or vegetables.

In contrast to the known machines, the transfer of the eggs from one scale pan to another in the machine according to the invention is effected by means of a so-called conveyor beam which describes a movement, parallel to itself, through a closed curve in a vertical plane passing through the scale pans, the said beam having openings to clear the scale pans and to constitute carriers for the eggs, and the movement being such that a carrier which passes one pan in ascending passes the next adjacent pan in descending, whereby the egg lying on the first pan is lifted and deposited on to the adjacent pan. There are at least the same number of carriers in the beam as there are scale pans, and both the carriers and the scale pans are arranged at a uniform distance apart.

A typical embodiment of the invention is diagrammatically illustrated in the accompanying drawing, in which:—

Figure 1:
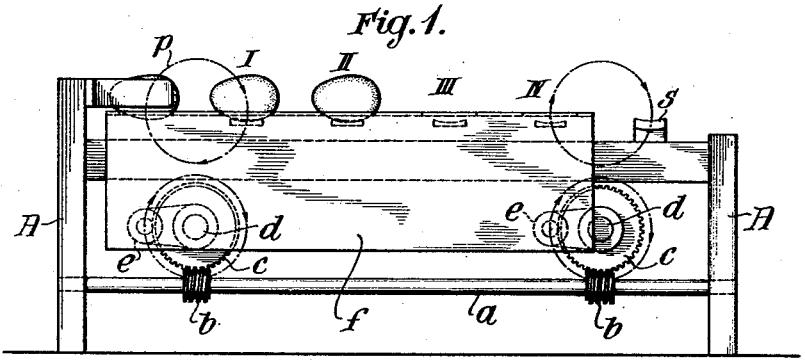
Figure 2:
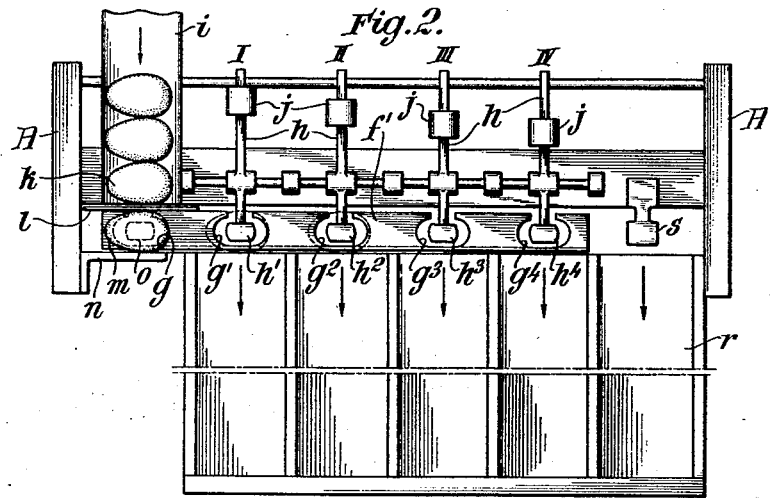
Figure 3:
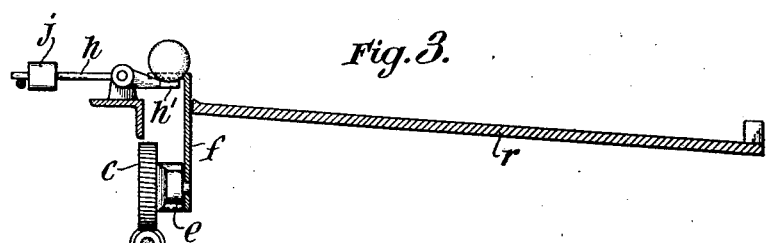
Figure 4:
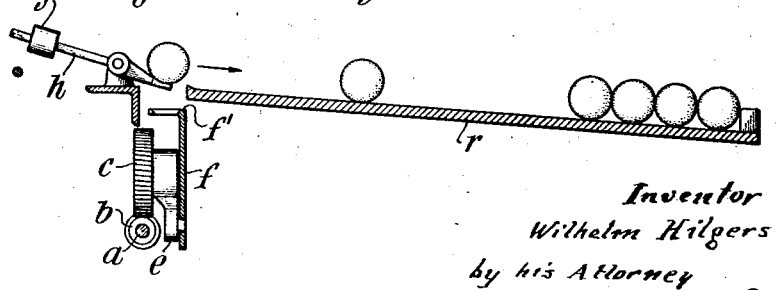

Fig. 1 is a front elevation,
Fig. 2 is a plan, and
Figs. 3 and 4 are sections, with the parts in different positions.

Reference A denotes the main frame members in which is mounted a shaft $a$ carrying two worms $b$, $b$ meshing with worm wheels $c$, $c$ rotatably mounted on fixed shafts $d$, $d$. Attached to the worm wheels are crank pins $e$, $e$ the free ends of which are connected to a conveyor beam $f$ having an upper bent-over portion $f^1$. This horizontal portion $f^1$ of the beam is provided with openings $g$, $g^1$, $g^2$, $g^3$, $g^4$ forming the egg carriers. $h$ are four balances with scale pans $h^1$, $h^2$, $h^3$, $h^4$ and adjustable weights $j$.

The egg carriers $g$ to $g^4$ in the horizontal portion $f^1$ of the conveyor beam $f$, are of such dimensions that they do not touch the scale pans $h^1$ to $h^4$ during the ascent and descent of said beam, whilst, on the other hand, eggs lying on the scale pans cannot drop through the carriers.

A trough $i$ slopes at such an angle towards the machine that the eggs placed in it roll down automatically in the direction of the arrow, Fig. 2. In so doing, the lowest egg $k$ for the time being is restrained by a plate $l$, which is connected with the conveyor beam in such a manner that the egg concerned is arrested only during the upper half of the circular movement of the beam under the action of the rotation of the cranks $e$. During the lower half of said movement, the plate $l$ is below the bottom of the trough $i$, and the egg $m$ moves on to a support $o$ (of the same shape as a scale pan) being arrested in the required position by a fixed stop $n$.

Movement of the beam $f$ is clearly such that each egg carrier describes a circular course. This course for the egg carrier $g$ is indicated by the arrow P in Fig. 1, and it will be seen that in the upper half of the course the said carrier rises past the support $o$ carrying the egg $m$ along with it, moves to the right and then descends past the adjacent scale pan $h^1$ leaving the egg thereon. In the other half of its course the egg carrier $g$ moves idly from right to left, below the level of the scale pans to its original position. In this manner, therefore, the egg is transferred from the support $o$ to the scale pan $h^1$. By the same movement of the beam any egg lying on the pan $h^1$ is simultaneously transferred, in exactly similar manner by the egg carrier $g^1$, to the scale pan $h^2$, whilst any egg lying on $h^2$ is simultaneously transferred by the carrier $g^2$ to the scale pan $h^3$, and any egg lying on the scale pan $h^3$ is simultaneously transferred by the carrier $g^3$ to the scale pan $h^4$ and so on, that is to say, each egg is transferred to the next scale pan in the series.

The several balances $h^1$ to $h^4$ are adjusted to different weights, for example to 60, 58, 55 and 52 grammes respectively. Consequently, an egg weighing, for example 53 grammes, will not depress the scale pan $h^1$, but will be transferred, in the above described manner, to the pan $h^2$, thence to $h^3$ and from this latter to $h^4$. Since this scale is weighted for 52 grammes, it will be depressed from the position shown in Fig. 3 to that of Fig. 4, and the egg will roll down the delivery table $r$, which is divided into compartments. All the other balances operate in the same manner, so that all the eggs which have been heavy enough to depress a scale pan are separated out. The small eggs which have been unable to depress any of the scale pans, are all removed at $s$.

For the sake of simplicity, the driving mechanism described above consists of a simple crank mechanism $e$—$e$ (Figs. 1 and 2) which imparts a circular course to the egg carriers. In practice, by modifying the crank mechanism, this course can be changed into a form approximating more to the quadrilateral with well rounded edges, thus reducing the vertical height of the stroke.

I claim:—

1. In a machine for grading articles by weight, the combination of a plurality of weighing scales uniformly spaced side by side with their scale pans in alignment, a conveyor beam mounted for movement parallel to itself through a closed curve in a vertical plane passing through the scale pans, the conveyor beam having openings to clear the scale pans and to constitute carriers for the articles, and means for imparting the said movement to the conveyor beam whereby an article lying on one scale pan is lifted, transferred and deposited on to the next scale pan.

2. In a machine for grading articles by weight, the combination of a plurality of weighing scales uniformly spaced side by side with their scale pans in a row, a fixed pan similar to the scale pans at one end of the row, a trough for feeding the articles one by one to the fixed pan, a conveyor beam mounted for movement parallel to itself through a closed curve in a vertical plane passing through the pans, the conveyor beam having openings to clear the pans and to constitute carriers for the articles, means for imparting the said movement to the conveyor beam whereby an article lying on one pan is lifted, transferred and deposited on to the next pan, and means for retaining the articles in the feed trough during the upward portion of the movement of the conveyor beam.

3. In a machine for grading articles by weight, the combination of a plurality of weighing scales uniformly spaced side by side with their scale pans in a row, a fixed pan similar to the scale pans at one end of the row, a trough for feeding the articles one by one to the fixed pan, a conveyor beam mounted for movement parallel to itself through a closed curve in a vertical plane passing through the pans, the conveyor beam having openings to clear the pans and to constitute carriers for the articles, means for imparting the said movement to the conveyor beam whereby an article lying on one pan is lifted, transferred and deposited on to the next pan, means for retaining the articles in the feed trough during the upward portion of the movement of the conveyor beam, and a stop for positioning the article fed to the fixed pan during the remaining portion of the said movement.

4. A machine for grading articles by weight comprising a plurality of weighing scales uniformly spaced side by side with their scale pans in alignment, a conveyor beam mounted for movement parallel to itself through a closed curve in a vertical plane passing through the scale pans, the conveyor beam having openings to clear the scale pans and to constitute carriers for the articles, means for imparting the said movement to the conveyor beam whereby an article lying on one scale pan is lifted, transferred and deposited on to the next scale pan, and delivery troughs one for each scale pan.

5. A machine for grading articles by weight comprising a plurality of weighing scales uniformly spaced side by side with their scale pans in a row, a fixed pan similar to the scale pans at one end of the row, a trough for feeding the articles one by one to the fixed pan, a separate delivery trough for each scale pan, a conveyor beam mounted for movement parallel to itself through a closed curve in a vertical plane passing through the pans, the conveyor beam having openings to clear the pans and to constitute carriers for the articles, means for imparting the said movement to the conveyor beam whereby an article lying on one pan is lifted, transferred and deposited on to the next pan, and means for retaining the articles in the feed trough during the upward portion of the movement of the conveyor beam.

6. A machine for grading articles by weight comprising a plurality of weighing scales uniformly spaced side by side with their scale pans in a row, a fixed pan similar to the scale pans at one end of the row, a trough for feeding the articles one by one to the fixed pan, a separate delivery trough for each scale pan, a conveyor beam mounted for movement parallel to itself through a closed curve in a vertical plane passing through the pans, the conveyor beam having openings to clear the pans and to constitute carriers for the articles, means for imparting the said movement to the conveyor beam whereby an article lying on one pan is lifted, transferred and deposited on to the next pan, means for retaining the articles in the feed trough during the upward portion of the movement of the conveyor beam, and a stop for positioning the article fed to the fixed pan during the remaining portion of the said movement.

WILHELM HILGERS.